United States Patent
Buss et al.

(10) Patent No.: US 12,211,292 B2
(45) Date of Patent: Jan. 28, 2025

(54) VEHICLE POSE ESTIMATION

(71) Applicant: Ford Global Technologies, LLC, Dearborn, MI (US)

(72) Inventors: Brian George Buss, Ypsilanti, MI (US); Sharnam Shah, San Francisco, CA (US); Md Nahid Pervez, Palo Alto, CA (US); Ganesh Kumar, Santa Clara, CA (US); Michael Feller, Farmington Hills, MI (US); Syed Ahmed, Anaheim, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 96 days.

(21) Appl. No.: 18/307,356

(22) Filed: Apr. 26, 2023

(65) Prior Publication Data
US 2024/0362927 A1    Oct. 31, 2024

(51) Int. Cl.
| G06V 20/56 | (2022.01) |
| G01C 21/00 | (2006.01) |
| G06T 7/70  | (2017.01) |
| G06V 10/24 | (2022.01) |

(52) U.S. Cl.
CPC ....... G06V 20/588 (2022.01); G01C 21/3822 (2020.08); G01C 21/3841 (2020.08); G06T 7/70 (2017.01); G06V 10/245 (2022.01)

(58) Field of Classification Search
None
See application file for complete search history.

(56) References Cited

U.S. PATENT DOCUMENTS

| 10,267,924 | B2  | 4/2019  | Ramanandan et al. |
| 2005/0234679 | A1 | 10/2005 | Karlsson |
| 2018/0088597 | A1 | 3/2018  | Shen |
| 2018/0188384 | A1 | 7/2018  | Ramanandan et al. |
| 2019/0301873 | A1 | 10/2019 | Prasser et al. |
| 2020/0124421 | A1* | 4/2020 | Kang ............... G01S 17/06 |

(Continued)

OTHER PUBLICATIONS

Lee, B.H., et al., "GPS/DR Error Estimation for Autonomous Vehicle Localization," sensors, 2015,20 pages.

(Continued)

*Primary Examiner* — Heather R Jones
(74) *Attorney, Agent, or Firm* — Frank A. MacKenzie; Brooks Kushman P.C.

(57) ABSTRACT

A computer includes a processor and a memory storing instructions executable by the processor to determine an estimated pose of a vehicle in a global reference frame having a first error and to determine an estimated second error based on a combination of the first error and a map error, in which the map error represents a difference between the estimated pose of the vehicle in the global reference frame and a corresponding estimated pose in a map-referenced frame. The stored instructions being additionally to predict a third error in a future map-referenced measurement frame based on the estimated second error and a motion model and to compute an update to the third error by combining the predicted third error with an accumulation of instantaneous vehicle position and heading errors obtained via a comparison between a camera-observed feature and a corresponding feature from a digital map.

20 Claims, 4 Drawing Sheets

(56) References Cited

U.S. PATENT DOCUMENTS

| | | | |
|---|---|---|---|
| 2020/0174487 A1 | 6/2020 | Viswanathan et al. | |
| 2020/0218905 A1 | 7/2020 | Wang et al. | |
| 2020/0240794 A1 | 7/2020 | Prasser et al. | |
| 2020/0263996 A1 | 8/2020 | Gokhale et al. | |
| 2020/0284590 A1* | 9/2020 | Chen | G01C 21/3841 |
| 2020/0318976 A1 | 10/2020 | Bush et al. | |
| 2021/0063199 A1 | 3/2021 | Akbarzadeh et al. | |
| 2021/0156711 A1* | 5/2021 | Flade | G01C 25/00 |
| 2022/0205804 A1* | 6/2022 | Fu | G01S 7/295 |
| 2022/0270358 A1 | 8/2022 | Cox | |

OTHER PUBLICATIONS

Kang, J.M., et al., "Lane-Level Map-Matching Method for Vehicle Localization Using GPS and Camera on a High-Definition Map," sensors, 2020, 22 pages.

Asghar, R., et al., "Map Relative Localization Based on Visual and Topological Map Matching," HAL open space, Dec. 2019, 8 pages.

Bagschik, G et al., "Map-relative localization in lane-level maps for ADAS and autonomous driving," ResearchGate, Jun. 2014, 8 pages.

Zhang, Y, et al., Real-time localization method for autonomous vehicle using 3DLIDAR, ResearchGate, Aug. 2017, 6 pages.

Pink, O., "Visual map matching and localization using a global feature map," IEEE, 2008, 5 pages.

\* cited by examiner

VEHICLE POSE ESTIMATION

BACKGROUND

Some vehicles can be operated in an autonomous or semi-autonomous mode. In such vehicles, a vehicle computer can be programmed to operate the vehicle independent of human intervention, such as to apply steering commands, braking commands, propulsion commands, and so forth, which guide the vehicle. To autonomously or semi-autonomously operate the vehicle, the computer may receive input signals from various onboard sensors, which may be utilized to indicate the location of the vehicle on a digital map.

DETAILED DESCRIPTION

Figure 1:
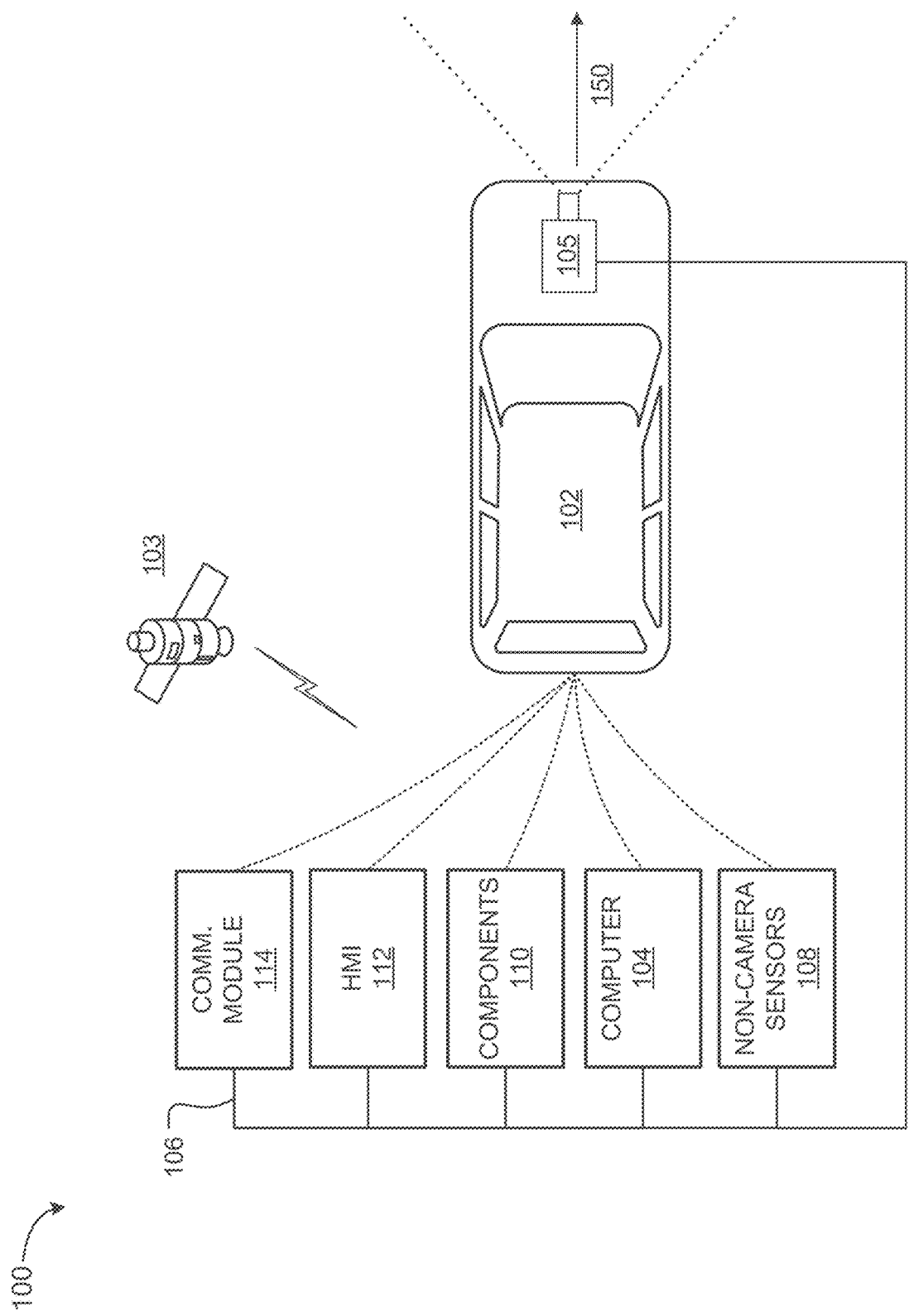
FIG. 1 is a diagrammatic top view of an example vehicle.

An autonomous and/or semi-autonomous vehicle can, at times, utilize digital maps in a process to guide the vehicle along a roadway. This disclosure provides techniques for optimally estimating the location of the vehicle in relation to features depicted on a high-definition digital map. In this context, a "high-definition digital map" is defined as a digital map that depicts numerous landmarks and/or road markings such as those indicating speed bumps, turn lanes, lane markings, etc., in which discrepancies exist between locations of landmarks and/or road features indicated on the digital map and the actual or true locations of the landmarks and/or features in a global reference frame. In some instances, a discrepancy between a location of a landmark or road marking indicated on the digital map and the true location of the landmark or road marking can be predicted based, at least in part, on an estimation of previous discrepancies and an estimate of the pose of the vehicle in a global reference frame utilizing signals from a satellite positioning system, e.g., a global positioning system (GPS), and vehicle-mounted sensors. In example embodiments, estimations of the vehicle total pose, which accounts for discrepancies in the location of the vehicle in a global reference frame as well as discrepancies in feature locations derived from a digital map, can be performed without attempting to correct the digital map, such as to reconcile landmarks and/or road markings of the digital map with true locations of the landmarks and/or road markings. Rather, the vehicle total pose can be estimated by tracking, rather than attempting to correct, discrepancies that exist between locations of landmarks and/or road markings indicated on a digital map and true locations of the landmarks and/or road markings in a global reference frame. In some instances, a high-definition digital map may be relatively accurate within a map-referenced frame, which means that distances between landmarks and/or road markings of a digital map may represent actual distances in a global reference frame.

A computer may operate to perform one or more separate optimal filtering processes, which may involve the use of, for example, a Kalman filter, a particle filter, an averaging filter, etc., to determine an estimate of the vehicle pose in relation to a global reference frame. In this context, the term "optimal filtering" refers to an adaptive extraction of a desired signal or input in the presence of noise and/or interfering signals and/or inputs. An estimate of vehicle pose in the global reference frame can then be utilized as an input to a process to localize the vehicle in a digital map-referenced frame. Computation of an optimal estimate of the vehicle total pose may be performed in a manner that accounts for discrepancies in vehicle pose estimation arising from estimating the vehicle pose in a global reference frame as well as accounting for errors that represent a difference between the estimated pose of the vehicle in the global reference frame and a corresponding estimated pose of the vehicle in a map-referenced frame. As the term is used herein, an "error" is defined as a measure of an estimated discrepancy between a measured, observed, and/or computed state of an object and the actual or true value of the state of the object. In an example, a vehicle may be located at a particular location within a global coordinate system, such as longitude and latitude. The vehicle can include an onboard receiver to acquire satellite positioning signals (e.g., signals from satellites of a global positioning system or GPS). In response to a signal processing operation, a computer, which may operate as an integral part of a GPS receiver or which may operate as a separate vehicle computer, can arrive at a computed longitude and latitude. In such an example, a discrepancy between the vehicle's computed GPS location and the actual location of the vehicle can be referred to as a positional error. In another example, a digital map may indicate that a particular feature is located at a particular identified set of coordinates in a global reference frame. However, the digital map may include an error or discrepancy between the location of the feature and the actual or true position of the feature in the global reference frame.

Advantageously, vehicle total pose may be more accurately estimated utilizing relatively inexpensive onboard satellite positioning system (e.g., GPS), inertial measurement units, cameras, speed sensors, vehicle steering sensors etc., as well as utilizing digital maps containing discrepancies between locations of identified landmarks and/or road markings and their true locations. Further, through the use of two or more closed-loop operations involving optimal filtering processes, inconsistencies and/or increases, such as sudden increases, in discrepancies in predicted or updated pose estimations greater than a threshold value can operate as an indicator of a malfunction or degradation of one or more vehicle sensors. In an example, by way of a closed-loop process, the probability of providing an incorrect location estimate is reduced in view of a previous location estimate having already been corrected or reduced in a previous measurement frame. An error in a current measurement frame can thus be refined. Accordingly, an indication of a sensor malfunction can be detected via an abrupt increase in error in the current measurement frame.

Typically, vehicle computers estimate vehicle locations based on generated high-definition maps, which contain relatively accurate locations of map features in a global reference frame, in which such accuracy could facilitate or permit localization within a vehicle's travel path. However, correction of discrepancies in high-definition maps, such as by a vehicle computer while the vehicle is in motion, typically involves time-consuming and processing intensive vehicle computational resources. Further, correction of discrepancies in high-definition maps could result in lower localization accuracy.

Example methods provide an effective near ground truth of vehicle pose in a shifted map frame, in which even utilizing a digital map that includes discrepancies between landmarks and/or road markings from their ground-truth locations, an accurate near ground truth pose of a vehicle in map frame can be determined. Thus, example embodiments can provide efficient vehicle total pose estimation without significant increases in computer processing by estimating the location of the vehicle without a need to correct a digital map. For example, in response to determining vehicle pose in a global reference frame utilizing signals from a satellite positioning system (e.g., GPS), images from an onboard camera may be utilized to more closely estimate and track errors in the vehicle pose, rather than attempt to correct discrepancies in high-definition digital maps, by comparing observed landmarks and/or road markings, and aligning landmarks and/or road markings depicted on, or derived from, a high-definition digital map. The vehicle's total pose can then be computed by shifting the vehicle's pose to accord with the visible landmarks and/or road markings. Accordingly, the vehicle computer can provide localization of the vehicle within the vehicle's travel path, which can allow the vehicle to travel on a roadway in an autonomous or semi-autonomous driving mode.

In an example, a computer includes a processor and a memory, the memory storing instructions executable by the processor to determine an estimated pose of a vehicle in a global reference frame, the estimated pose could include a first error. The executable instructions can additionally be to determine an estimated second error based on a combination of the first error in the estimated pose and a map error, the map error being the difference between the estimated pose of the vehicle in the global reference frame and a corresponding estimated pose of the vehicle in a map-referenced frame. The executable instructions can additionally be to predict a third error in a future map-referenced measurement frame based on the estimated second error and based on a motion model. The executable instructions can additionally be to compute an update to the third error by combining the predicted third error with an accumulation of instantaneous vehicle position and heading errors obtained via a comparison between a camera-observed feature and a corresponding feature depicted on a digital map.

The instructions can further include instructions to compute an estimate of the pose of the vehicle in the map-referenced frame.

The instructions can further include instructions to actuate a component of the vehicle based on the computed update to the third error.

The instructions can further include instructions to track the computed update to the third error via a closed-loop process.

The instructions can further include instructions to track the computed update to the third error via a closed-loop optimal filtering process.

The instructions can further include instructions to track the computed update to the third error and to identify a degradation in a function of a sensor of the vehicle based on a change in the difference in an estimated pose of the vehicle in the global reference frame and the estimated pose of the vehicle in an updated map-referenced frame.

The feature on the digital map can indicate a road marking in a roadway.

The determined estimated second error in an initialization measurement frame can include a value of less than a distance determined based on the width of the vehicle travel path. The update to the third error can be a continuous function of time.

In an example, the instructions to determine the estimated second error do not apply a correction to the position of the feature in the global reference frame.

The instructions to determine the estimated second error can include instructions to fuse inputs from a sensor of a global positioning system, a camera, and one of a wheel speed sensor, a radar sensor, and an inertial measurement unit.

The estimated pose of the vehicle in the map-referenced frame can include errors in a heading of the vehicle, errors longitudinal to the heading of the vehicle, and/or errors in a direction lateral to the heading of the vehicle.

The comparison between the camera-observed feature and the corresponding feature on the digital map can be obtained via aligning the digital map feature with the feature observed by the camera.

The instructions to determine the estimated pose of a vehicle in a global reference frame can include instructions to implement an optimal filter.

The instructions to determine the estimated pose of the vehicle in the global reference frame and the instructions to determine the estimated second error based on the combination of the first error in the estimated pose with the map error can operate as separate optimal filtering processes.

In an example, a method can include determining an estimated pose of a vehicle in a global reference frame, the estimated pose having a first error. The method can additionally include determining an estimated second error based on a combination of the first error in the estimated pose and a map error, the map error being the difference between the estimated pose of the vehicle in the global reference frame and a corresponding estimated pose of the vehicle in a map-referenced frame. The method can additionally include predicting a third error in a future map-referenced measurement frame based on the estimated second error and based on a motion model and computing an update to the third error by combining the predicted third error with an accumulation of instantaneous vehicle position and heading errors obtained via a comparison between a camera-observed feature and a corresponding feature depicted on a digital map.

The method can additionally include tracking the computed update to the third error and identifying a degradation of a function of a sensor or of an algorithm based on a change in the difference between the estimated pose of the vehicle in the global reference frame and the estimated pose of the vehicle in the global reference frame exceeding a threshold value in an updated measurement frame.

The feature on the digital map can correspond to a road marking in a roadway.

The determined estimated second error in an initialization measurement frame can include a value of less than a distance determined based on the width of the vehicle travel path.

The determining of the estimated pose of the vehicle in the global reference frame and the determining of the estimated second error based on the combination of the first error in the estimated pose with the map error can operate as separate optimal filtering processes.

The adjectives "first" and "second" are used throughout this document as identifiers and are not intended to signify importance, order, or quantity.

With reference to the Figures, wherein like numerals indicate like parts throughout the several views, FIG. 1 is a diagrammatic top view of an example vehicle 102. Vehicle 102 may comprise any passenger or commercial automobile such as a car, a truck, a sport utility vehicle, a crossover, a van, a minivan, a taxi, a bus, an unmanned or remotely controlled robotic vehicle, etc. Vehicle 102 may be operated autonomously, semi-autonomously, or non-autonomously. In an autonomous or semi-autonomous driving mode, computer 104 can be programmed to operate the vehicle independently of the intervention of a human operator, completely or to a lesser degree. Computer 104 may thus be programmed to operate the vehicle's propulsion system, braking system, steering system, and/or other vehicle systems.

Vehicle 102 may receive input signals from a camera 105 as well as from additional sensors, such as non-camera sensors 108. In example embodiments, camera 105 may operate to digitize a scene corresponding to an area in an environment external to vehicle 102, such as a scene that includes other vehicles, road markings (e.g., lane markings, boundary lines, direction arrows), signposts, abutments, and/or traffic signs, etc. Computer 104 may be programmed to receive signals from camera 105 and non-camera sensors 108 so as to classify or categorize objects within the field of view of camera 105. Vehicle 102 may utilize several of cameras 105, which may operate to detect electromagnetic radiation in some range of wavelengths. For example, camera 105 may detect visible light, infrared radiation, ultraviolet light, or some range of wavelengths including visible, infrared, and/or ultraviolet light. For example, camera 105 can utilize charge-coupled devices (CCD), complementary metal oxide semiconductors (CMOS), or any other suitable technology. Camera 105 can be fixed relative to the vehicle 100, e.g., fixedly mounted to vehicle 102. Camera 105 may be oriented generally horizontally. A center of a field of view of camera 105 may be closer to horizontal than to vertical, e.g., may be tilted slightly downward from horizontal. Additional cameras similar to camera 105 may be utilized to collectively provide a 360° horizontal field-of-view around vehicle 102. For example, vehicle 102 may include four cameras similar to camera 105 aimed in a vehicle-forward direction, a vehicle-left direction, a vehicle-rearward direction, and a vehicle-right direction, respectively.

Non-camera sensors 108 may correspond to a device(s) that can obtain one or more measurements of one or more physical phenomena. Some of non-camera sensors 108 may detect internal states of the vehicle, for example, wheel speed, wheel orientation, and engine and transmission variables. Some of non-camera sensors 108 may operate to receive satellite positioning signals such as those transmitted by GPS satellite 103, utilized in estimating the position of vehicle 102 in a global reference frame. Positioning signals from satellite 103 may be fused with sensors internal to vehicle 102, such as accelerometers (e.g., piezo-electric or microelectromechanical systems (MEMS)), gyroscopes (e.g., rate gyroscopes, ring laser gyroscopes, or fiber-optic gyroscopes), inertial measurements units, and magnetometers. Some of non-camera sensors 108 may detect the external world, including, for example, radar sensors, scanning laser range finders, light detection and ranging (LIDAR) devices, etc.

A memory of computer 104, such as those described herein, includes one or more forms of computer-readable media, and stores instructions executable by vehicle computer 104 for performing various operations, such that the vehicle computer is configured to perform the various operations, including those disclosed herein. For example, vehicle computer 104 can be a generic computer with a processor and memory as described above and/or may include an electronic control unit (ECU) or controller for a specific function or set of functions, and/or may include a dedicated electronic circuit including an ASIC (application specific integrated circuit) that is manufactured for a particular operation, e.g., an ASIC for processing data from camera 105 and non-camera sensors 108 and/or communicating data from camera 105 and non-camera sensors 108. In another example, vehicle computer 104 may include an FPGA (Field-Programmable Gate Array) which is an integrated circuit manufactured to be configurable by a user. Typically, a hardware description language, such as VHDL (Very High Speed Integrated Circuit Hardware Description Language), is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically coupled to the FPGA circuit. In some examples, a combination of processor(s), ASIC(s), and/or FPGA circuits may be included in computer 104. Further, vehicle computer 104 could include a plurality of computers 104 onboard vehicle 102, e.g., a plurality of ECUs (electronic control units) or the like, operating together to perform operations ascribed herein to vehicle computer 104.

Vehicle computer 104 may be coupled to a memory, which can be of any type, e.g., hard disk drives, solid state drives, servers, or any volatile or non-volatile media. The memory can store the collected data sent from camera 105 and from non-camera sensors 108. The memory can be a separate device from the processor of computer 104, and the processor of computer 104 can retrieve information stored by the memory of computer 104 via a communication network in the vehicle such as vehicle network 106, e.g., over a CAN bus, a wireless network, etc. Alternatively or additionally, the memory can be packaged together with the processor of computer 104, e.g., as a memory of computer 104.

Computer 104 can include programming in the form of executable instructions, which operate one or more components 110 such as vehicle brakes, propulsion (e.g., one or more of an internal combustion engine, electric motor, hybrid engine, etc.), steering, climate control, interior and/or exterior lights, etc., as well as to determine whether and when computer 104, as opposed to a human operator, is to control such operations. Additionally, computer 104 may be programmed to determine whether and when a human operator is to control such operations. Computer 104 may include or be communicatively coupled to, e.g., via vehicle network 106, such as a communications bus as described further below, more than one processor, e.g., included in components 110 such as camera 105 and non-camera sensors 108, electronic control units (ECUs) or the like included in the vehicle for monitoring and/or controlling various vehicle components, e.g., a powertrain controller, a brake controller, a steering controller, etc.

Computer 104 is generally arranged for communications on vehicle network 106, which can include a communications bus in the vehicle, such as a controller area network CAN or the like, and/or other wired and/or wireless mechanisms. Vehicle network 106 is a communications network via which messages can be exchanged between various devices, e.g., camera 105, non-camera sensors 108, components 110, computer 104(s), etc., onboard vehicle 102. Computer 104 can be generally programmed to send and/or receive, via vehicle network 106, messages to and/or from other devices of vehicle 102, e.g., any or all of ECUs, camera 105, non-camera sensors 108, actuators, components 110, communications component 114, human machine interface (HMI) 112, etc. For example, various components 110 and/or subsystems (e.g., components 110 can be controlled by respective ECUs), camera 105, and/or non-camera sensors 108 may provide data to computer 104 via vehicle network 106. In turn, data from camera 105 and non-camera sensors 108 can be processed by computer 104 and can be communicated to remote locations, such as servers located in the cloud. For example, vehicle 102 may communicate with a remote server utilizing a vehicle-to-infrastructure (V2I) communications protocol, which facilitates communications between vehicles and remote computing entities.

Further, in examples in which computer 104 actually comprises a plurality of devices, vehicle network 106 may be utilized to conduct communications between devices represented as computer 104 in this disclosure. For example, vehicle network 106 can include a controller area network (CAN) in which messages are conveyed via a CAN bus, or a local interconnect network (LIN) in which messages are conveyed via a LIN bus. In some implementations, vehicle network 106 can include a network in which messages are conveyed using other wired communication technologies and/or wireless communication technologies, e.g., Ethernet, wireless fidelity (Wi-Fi®), Bluetooth®, etc. Additional examples of protocols that may be used for communications over vehicle network 106 in some implementations include, without limitation, Media Oriented System Transport (MOST), Time-Triggered Protocol (TTP), and FlexRay. In some implementations, vehicle network 106 can represent a combination of multiple networks, possibly of different types, that support communications among devices in a vehicle.

Computer 104 may be configured for communicating through a wireless communication interface with a second vehicle, e.g., via V2V, via vehicle-to-infrastructure (V2I) communication, and/or via a vehicle-to-everything (V2X) communication network (i.e., communications that can include V2V and V2I). Some of camera 105 and non-camera sensors 108 can be communications devices, for example, vehicle-to-infrastructure V2I or V2V devices, which may operate via a wireless communications network. Communications component 114 may include elements for sending (i.e., transmitting) and receiving radio frequency (RF) communications, e.g., chips, antenna(s), transceiver(s), etc. Communications component 114 represents one or more mechanisms by which computer 104 of vehicle 102 may communicate with other vehicles, and/or elements of a communications infrastructure and may be one or more of wireless communication mechanisms, including any desired combination of wireless and wired communication mechanisms and any desired network topology (or topologies when a plurality of communication mechanisms are utilized). Exemplary V2X communication protocols include cellular, IEEE 802.11, dedicated short-range communications (DSRC), and/or wide area networks (WAN), including the Internet, providing data communication services. DSRC may have one-way or two-way short-range to medium-range wireless communication channels. A V2X communication network may have multiple channels, each identified by an identifier, e.g., channel number.

Exemplary System Operations

Figure 2:
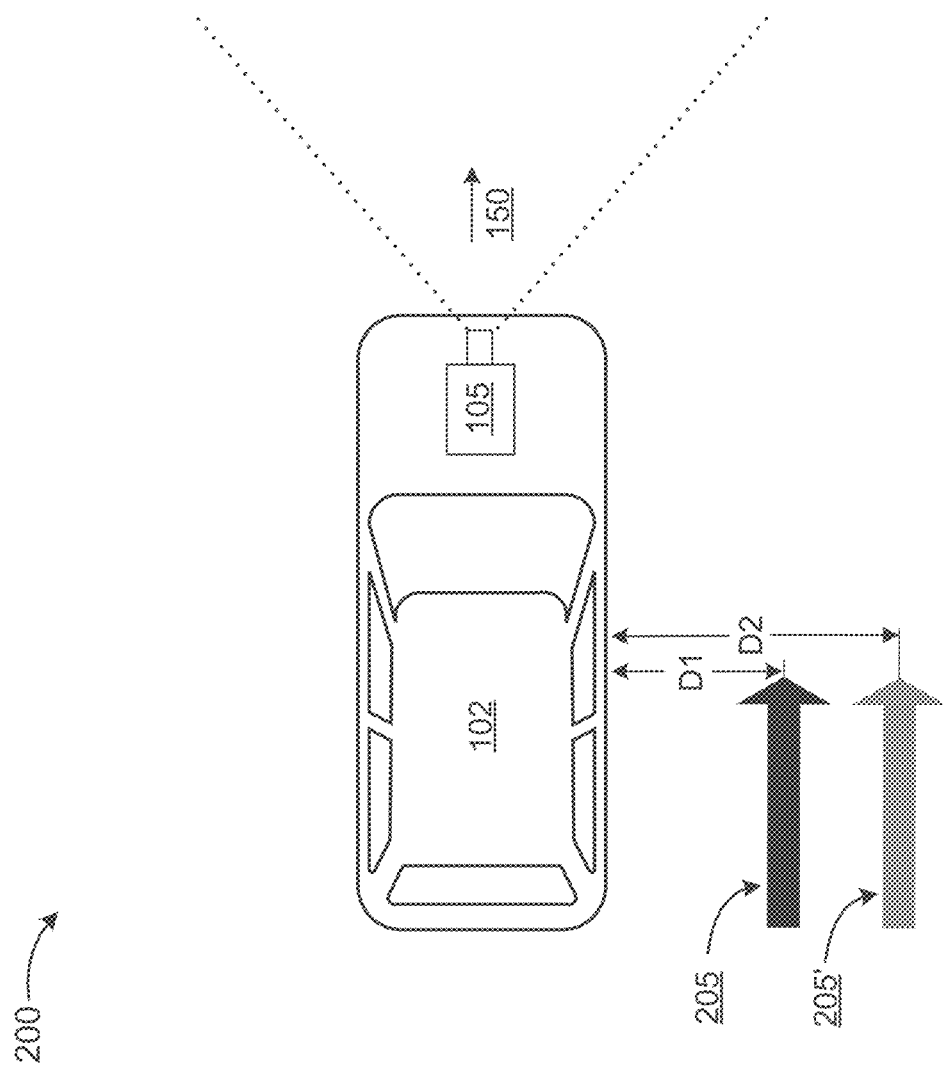
FIG. 2 is a diagram of an example vehicle traveling through a traffic environment.

FIG. 2 is a diagram 200 of vehicle 102 traveling through a traffic environment. In the context of this disclosure, a traffic environment refers to any two-dimensional area on the surface of the earth. A location of vehicle 102 may be defined by GPS coordinates, e.g., as vertices of a triangular or rectangular area, a center of a circular area, etc. The traffic environment of FIG. 2 may correspond to a rural road, a city street, a parking lot, a freeway or expressway, etc. As vehicle 102 proceeds along path 150 through the traffic environment of FIG. 2, satellite positioning signals and measurements from non-camera sensors 108 can be processed to estimate the location of vehicle 102 in a global reference frame. In turn, the estimated location of vehicle 102 can be translated to an estimated location on an electronic or digital map. Thus, as vehicle 102 proceeds along path 150, the position of the vehicle may be superimposed on a digital map, thereby allowing the operator of vehicle 102 to locate the vehicle relative to surrounding features. Further, responsive to vehicle 102 being operated in an autonomous or semi-autonomous driving mode, computer 104 of vehicle 102 may execute appropriate control functions, which, in turn, can actuate vehicle steering, propulsion, and braking, so as to enable vehicle 102 to continue along path 150.

However, as previously mentioned herein, a digital map may be high-definition in that features expected to be present at particular locations in a global reference frame may be shifted in one or more directions from true locations on a digital map. Thus, in the example of FIG. 2, responsive to computer 104 estimating a present position of vehicle 102 in a global reference frame, road marking 205 visible to camera 105 may appear displaced from their expected positions. Thus, as indicated in FIG. 2, based on an estimation of vehicle 102 in a global reference frame, road marking 205 may be expected to be immediately to the right of vehicle 102. However, in response to discrepancies between features indicated on the digital map utilized by vehicle 102 and the actual locations of the features, camera-observed road marking 205' appears shifted to the right. Accordingly, although a digital map may indicate that vehicle 102 is presently located at a distance "D1" from a road marking, the true position of vehicle 102 may be shifted to the left. Thus, vehicle 102 may, in fact, be located a distance "D2" from a road marking. In such an instance, camera 105 may operate to correct the estimated location of vehicle 102. By way of shifting the location of vehicle 102 in a slightly rightward (i.e., laterally) direction. Thus, as described further herein, by tracking and/or predicting differences in locations of features from a global reference frame to a map-reference frame, vehicle 102 may achieve localization of vehicle within the vehicle's travel path which, for example, may permit localization of vehicle 102 to within, for example, 40 centimeters or less.

In the present context, expected and observed road marking 205, 205' represent any feature present in the traffic environment of vehicle 102. Thus, predicted and observed road markings 205, 205' can correspond to any feature present on a digital map. In this context, a feature is defined as any item that appears on a digital map along with a corresponding map-referenced location. Accordingly, a feature may include a road boundary, a metal or concrete guard boundary, a traffic sign, a signpost, a fire hydrant, a natural object (e.g., a tree, shrubbery, an outcropping), a pattern (e.g., of a roundabout), a building, a bridge, a delineator, and a raised pavement marker. A feature can include a feature of an unpaved dirt road or a road paved with concrete, asphalt, tar, etc. Further, a roadway may have one or more travel paths, such as lanes, each of which may be identified by road markings 205, 205'. A road may be one-way or two-way. A roundabout may have a circular or oval shape. An intersection may be a location where two or more roads intersect. A feature may be a raised and/or flush pavement marker formed of metal, plastic, etc., that is mounted to and/or embedded in a road surface, and/or a painted marking on the road surface. A feature may be a boundary (or edge) of a road that is a set of points defining location where a road surface material, e.g., asphalt, ends. In the present context, a boundary or other type feature may additionally or alternatively include one or more physical roadway features such as a traffic barrier including metal guardrail boundaries, one or more road markings 205, 205', such as a painted line or lines, etc. A traffic environment may include any type of structures such as traffic sign(s), bridge(s), etc. and/or vegetation(s), hill(s), mountain(s), etc.

As vehicle 102 travels through along path 150, vehicle 102 has a location and a heading with respect to a traffic environment of FIG. 2. The location of vehicle 102 may have at least two horizontal coordinates in a global reference frame (e.g., specifying a location on the surface of the Earth), and the estimations of the location discussed throughout this disclosure may likewise have two horizontal coordinates. The heading is the horizontal forward direction defined by the orientation of vehicle 102. The location and the heading are estimated by computer 104 as described below.

Figure 3:
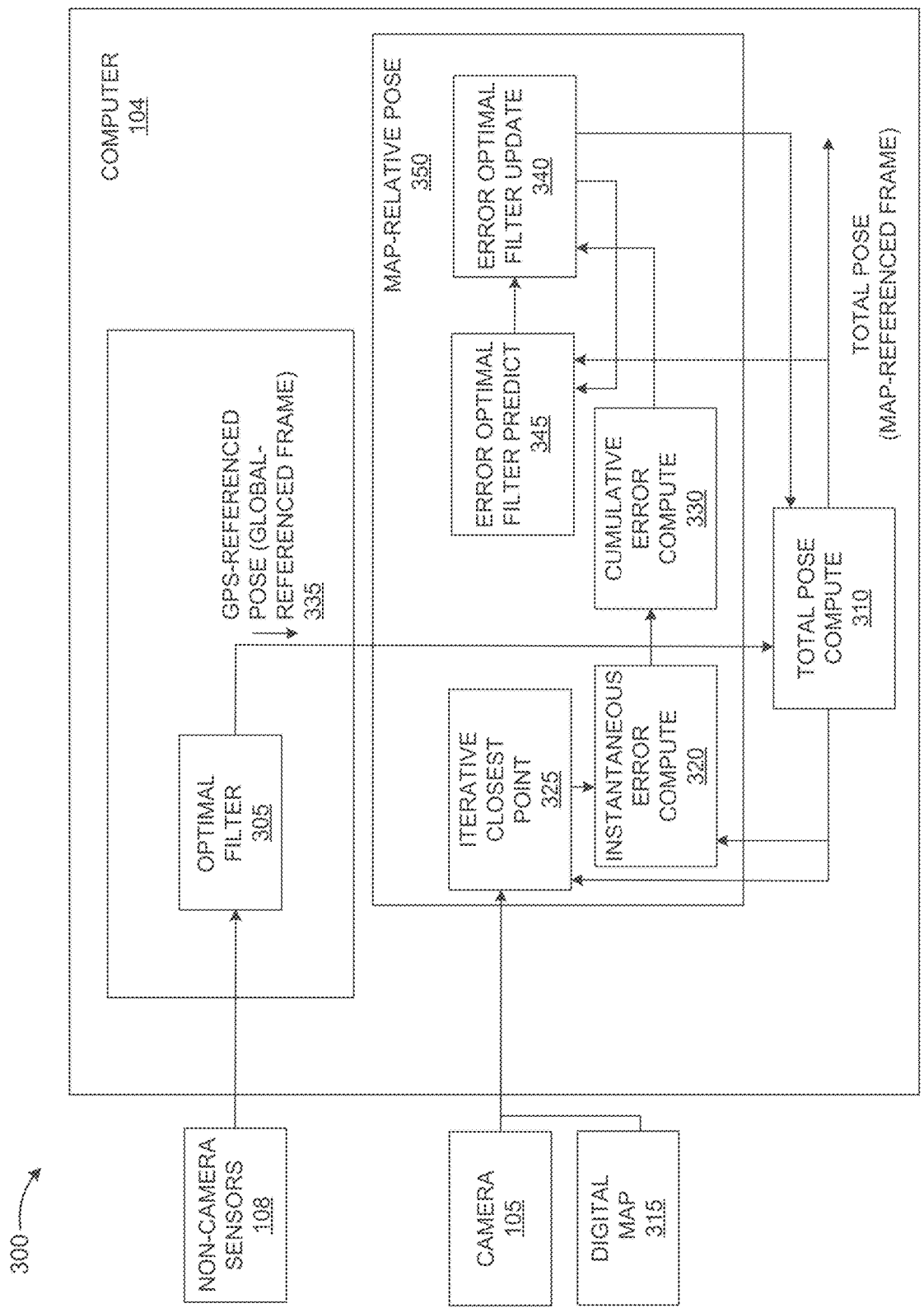
FIG. 3 is a diagram of an example computer to perform operations to compute pose of a vehicle utilizing a high-definition digital map.

FIG. 3 is a diagram of an example 300, in which a computer, e.g., computer 104, performs operations to compute pose of a vehicle utilizing a high-definition digital map. In an example embodiment, computer 104 of vehicle 102 can implement optimal filter block 305 to receive input signals from non-camera sensors 108, e.g., a GPS receiver, an inertial measurement unit, etc., to compute an estimated pose of vehicle 102 in a global reference frame, in which the estimated pose includes a first error. In addition to computing an estimated pose of vehicle 102, computer 104 can additionally compute an estimation of a second error, which can represent a combination of the first error as well as a discrepancy or error between the true location of a feature, such as road markings in the global frame, and location of these same features as indicated by high-definition digital map 315. Computer 104 can then compute a map-referenced pose, e.g., in block 350, of vehicle 102 by combining the first error, e.g., the error in the estimated pose of vehicle 102, with an error in digital map 315 to arrive at a second error. Computer 104 can then utilize a motion model, e.g., in block 345, to compute a predicted third error, which can correspond to an error between the GPS-referenced pose of vehicle 102 in the global reference frame (335) and the corrected vehicle position in the map-referenced frame (effective ground truth position of vehicle 102 in the map frame). Computer 104 can then compute an update to the third error by combining the predicted third error with an accumulation of instantaneous vehicle position and heading errors obtained via a comparison between a camera-observed feature, e.g., road marking 205', and a corresponding feature depicted on a digital map, e.g., road marking 205. Computer 104 may than actuate a component of the vehicle based on the computed update to the third error, which can represent the estimated vehicle total pose in the map-referenced frame.

As indicated in FIG. 3, computer 104 may receive inputs from non-camera sensors 108, which may include input signals representing wheel speed, wheel orientation, inertial measurement, odometry, as well as signals from an onboard radar sensor, an onboard lidar sensor, a GPS receiver, etc. Computer 104 can compute GPS-referenced pose 335, which represents an estimated pose of vehicle 102 in a global reference frame, e.g., an estimate of the latitude and longitude of vehicle 102. In FIG. 3, computer 104 can compute GPS-referenced pose 335 utilizing optimal filter block 305, which may include an averaging filter, a Kalman filter, a particle filter, or any other digital filtering technique that operates to adaptively extract desired signals or inputs in the presence of noise and/or interfering signals and/or inputs.

Output signals representing GPS-referenced pose 335 may be utilized as input signals to block 310 executing on computer 104, in which computer 104 computes a map-referenced pose at block 350. In an initialization measurement frame, in block 310, computer 104 transmits an estimate of GPS-referenced pose 335 to block 325.

In block 325, computer 104 receives input signals in the form of parameters on, or derived from, digital map 315. In block 325, computer 104 performs operations to localize vehicle 102 on digital map 315 by way of successively sampling output signals from block 310 to align the current camera-observed objects (e.g., features such as road markings, landmarks) whose locations are obtained using a propagated previous map-referenced frame, e.g., the immediately preceding map-referenced frame, with the corresponding map objects in the current map-referenced frame. Digital map 315 may include an error, e.g., map error, in which features, such as road markings, identified on digital map 315 may deviate from their corresponding true locations, e.g., computed in a GPS reference frame, by approximately 1-2 meters, for example. To assist in such computation, computer 104 receives input signals from camera 105 and performs successive operations to estimate the location of vehicle 102 in relation to parameters on, or derived from, digital map 315. For example, in response to receiving the estimated location of vehicle 102 in a global reference frame, computer 104 aligns images of road markings from camera 105 with road markings derived from digital map 315 expected to be present at or nearby the estimated location of vehicle 102.

Output signals from block 325, may be conveyed to block 320. In block 320, computer 104 computes an initialized estimate of an error, e.g., first and second errors, between the estimated location of a feature in a global reference frame and a corresponding feature at the estimated location from digital map 315.

Computer 104 can then convey output signals from block 320 to block 330, which operates to accumulate errors, e.g., second errors, between estimated locations of features from a global reference frame with features at corresponding locations of digital map 315 (i.e., within the reference frame of digital map 315). It should be noted that in certain examples, cumulative errors, e.g., second errors, of features in the reference frame of digital map 315 may vary as a continuous function of time as vehicle 102 proceeds along the path 150 and in a predictable manner. Thus, for example, responsive to computer 104 determining, at block 320, that the location of a feature, e.g., road marking 205, indicated or derived from digital map 315 deviates by 1.0 meter from the location of the corresponding camera-observed feature, e.g., road marking 205', successive measurement frames may be expected to indicate errors e.g., second errors, having similar values, such as approximately 1.0 meter or to slightly increase or decrease. In another example, responsive to computer 104 assessing, at block 320, that a first measurement frame indicates that the location of a feature indicated or derived from digital map 315 deviates by 1.0 meters from the corresponding location of the feature from a global reference frame, in a second, in a subsequent measurement frame, such deviation may be expected to increase to 1.1 meters, or to decrease to 0.9 meters. Accordingly, in view of such predictable location errors, e.g., second errors, between measurement frames, computer 104, at block 330, can advantageously track errors between locations of features present or derived from digital map 315 with features observed by camera 105. Further, responsive to determination of an unexpectedly large error, e.g., a second error, between measurement frames, at block 330, computer 104 may provide an output signal indicating detection of such error. Such output signals may be utilized to detect a malfunction or degradation of a sensor, such as a malfunction or degradation of camera 105 and/or a malfunction or degradation of one or more of non-camera sensors 108. In example embodiments, expected discrepancies between the location of features indicated or derived from digital map 315 and the location of the corresponding camera-observed features are expected to be within 1-2 meters, which corresponds to a typical range of discrepancies between actual, GPS-referenced features and corresponding features identified on typical high-definition digital maps. It should be noted, however, that so long as computer 104 is capable of tracking errors in successive, sequential, measurement frames, computer 104 can accommodate errors of up to 8 meters, for example, so long as observed and expected features deviate from each other in a continuous manner.

Computer 104 may than transmit output signals from block 330 to block 340, which operates to maintain a current estimation of errors between locations of features on or derived from digital map 315 with features observed by camera 105. In block 345, computer 104 may implement a motion model of vehicle 102, which may characterize motion vectors of vehicle 102 and map errors. Based on an implemented motion model of vehicle 102, computer 104 may predict the error between the GPS-referenced pose and the effective near ground truth pose in the map frame at a future/current instant of time.

Computer 104 may transmit output signals from block 340 for input to block 345. Computer 104 may advantageously provide updates to predicted third errors based on an accumulation of instantaneous errors between features on or derived from digital map 315 and features observed by camera 105. In examples, and as previously mentioned, such errors follow a continuous trend. For example, in response to past comparisons of such errors increasing by 0.1 meters in successive measurement frames, future errors, may be predicted or expected to increase or decrease by similar amounts.

Computer 104 can then transmit signals from block 340 to block 310. In block 310, computer 104 computes a vehicle total pose that accounts for errors in the estimation of the pose of vehicle 102 in a global reference frame, e.g., first errors, and to account for updated errors e.g., second errors, between locations of features derived from digital map 315 and features observed by camera 105 in a map-referenced frame. In block 310, computer 104 may compute a corrected vehicle pose in a map-referenced frame. In an example, block 310 executes programming to transform a GPS-referenced pose (335) in a global reference frame to obtain a new corrected vehicle pose in the current map referenced frame (i.e., the corrected/effective near ground truth pose in the updated map-referenced frame). In an example the transformation at block 325 optimally aligns new camera-observed features using the propagated total pose output (from a previous output of block 310), in which the camera measurements and/or observations are obtained as a function of distance from the vehicle and are converted to the previous propagated map frame using the propagated total pose (e.g., a previous total pose output from 310) of vehicle 102, which can be compared to the corresponding new map features. Thus, as vehicle 102 proceeds along path 150, new camera-observed features are aligned with corresponding new map features obtained from digital map 315.

A corrected vehicle pose can be in a two-dimensional space, e.g., position and heading of the vehicle, position, heading, an elevation of the vehicle in a three-dimensional space, or even a higher dimensional space, utilizing input signals representing first errors, second errors, and the error between the GPS-referenced pose and the effective near ground truth pose in the map-referenced frame at a future/current instant of time. Output signals from block 310 can then be made available by computer 104 to exercise appropriate vehicle control functions. For example, in response to computer 104 indicating, in block 310, a vehicle total pose error of 1.5 meters, computer 104 may apply steering commands to shift the position of vehicle 102 in an appropriate direction so as to maintain vehicle 102 within road markings of path 150.

It should be noted that certain operations described in reference to FIG. 3 are performed by computer 104 in a closed loop fashion. For example, computer 104 may utilize output signals of block 310 as an input to block 325, which operates to further refine vehicle total pose by successively sampling output signals from block 310. At each successive iteration, camera-observed objects are tentatively associated with the map features closest to the camera-observed objects so as to update the total pose of vehicle 102. Computer 104 may utilize output signals from block 340, via block 310 as an initialized value in computations performed by computer 104 at block 325.

It may also be appreciated from the operations described in reference to FIG. 3 that in response to a sensor malfunction or degradation, such as a malfunction or degradation of camera 105, computer 104 may determine such a malfunction or degradation based, for example, on block 325 failing, for example, to align camera-observed features to expected locations of those features on or derived from digital map 315. In another example, a malfunction or degradation of a GPS sensor could bring about an increase in error, e.g., a first error, that exceeds a threshold observed by computer 104 at block 310. For example, an increase in error that exceeds a certain distance during localization of vehicle 102 with respect to a width of the vehicle's travel path, might indicate malfunction or degradation of a GPS sensor. Accordingly, responsive to detection of changes in computed errors, e.g., a second error, computer 104 may utilize block 350 to detect sensor malfunction or degradation, such as a malfunction or degradation of a GPS receiver, a malfunction or degradation of camera 105, a malfunction or degradation of one or more of non-camera sensors 108, etc. In response to detecting a malfunction or degradation of a sensor, computer 104 may set a diagnostic trouble code and/or actuate component 110 without using data from the sensor experiencing a malfunction or degradation.

Figure 4:
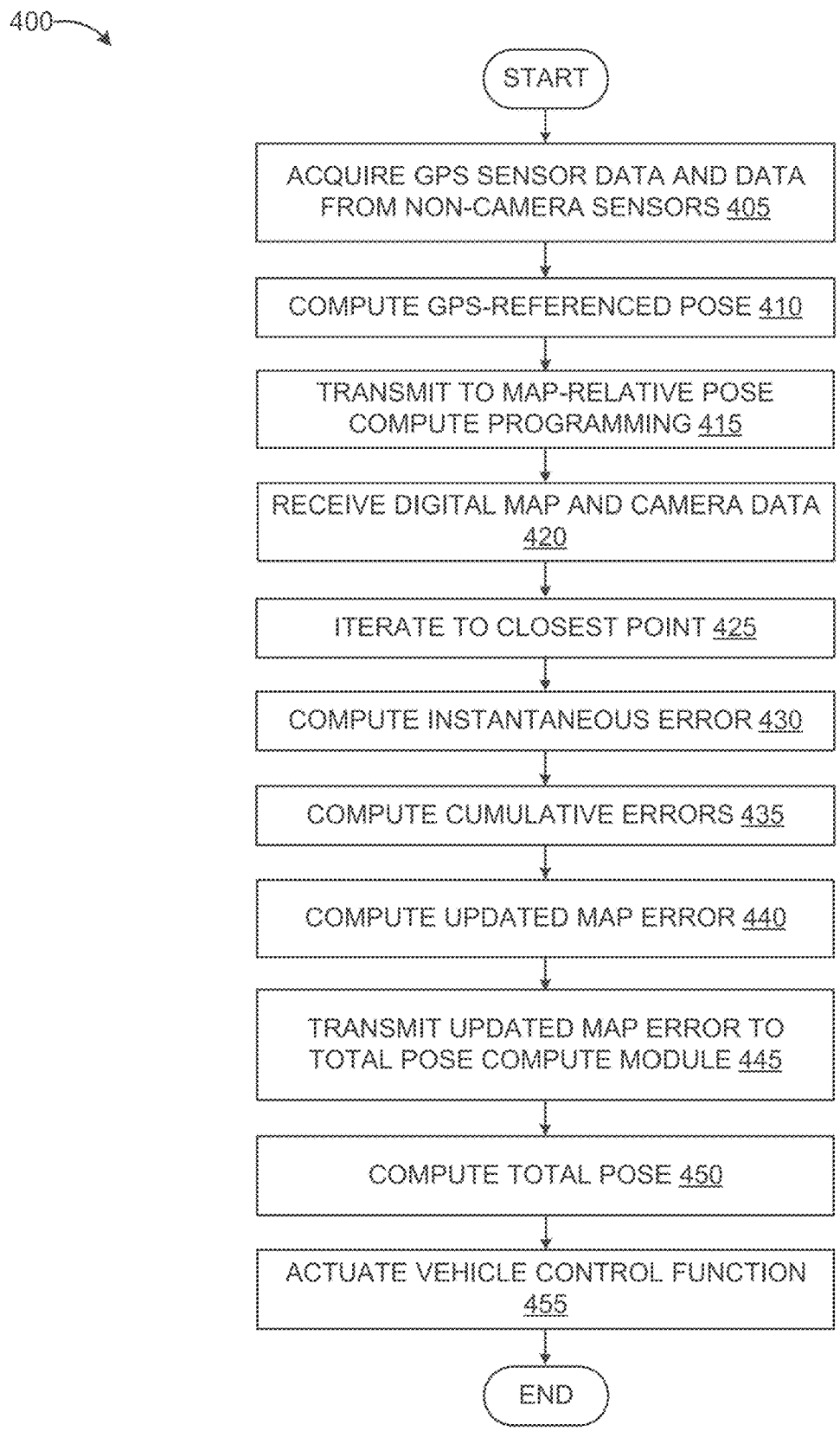
FIG. 4 is a flow diagram of an example process for determining a location of a vehicle utilizing a high-definition electronic or digital map.

FIG. 4 is a process flow diagram illustrating an example process 400 for estimating total pose of vehicle 102. A memory accessible to computer 104 stores executable instructions for performing the steps of process 400 and/or programming can be implemented in structures such as those mentioned above. As a general overview of process 400, computer 104 receives signals representing various sensor inputs, such as inputs from a GPS receiver and non-camera sensors 108. Computer 104 then computes an optimal solution utilizing such inputs to compute an estimate of the pose, and an estimated first error, of vehicle 102 in a global reference frame. Computer 104 can then compute an estimate of the map-referenced pose, which represents an estimate of the total pose of vehicle 102. The total pose of vehicle 102 includes a position error e.g., a first error, contained in an estimation of the GPS-referenced pose as well as errors e.g., second errors, which include the first error and the map errors, e.g., lateral or longitudinal shifts, inherent in high-definition digital map 315. Computer 104 can reduce the second errors by computing an iterative closest point, which operates to determine the location of a digital map feature that correspond to a closest feature e.g., a road marking, observed by camera 105 of vehicle 102. Computing the iterative closest point can involve aligning digital map features e.g., road markings, with features observed by camera 105. Computer 104 can then accumulate, track, and predict instantaneous errors, e.g., second errors, between the location of the camera-observed feature and the corresponding feature on, or derived from, digital map 315. Computer 104 can transmit a predicted second error, which includes positional errors computed in a global reference frame and map errors, to refine iterative closest point estimates. Iterative closest point estimates can be utilized to update a third error between the GPS-referenced pose and the effective near ground truth pose in the map frame at a current instant of time utilizing a motion module executing on computer 104. A third error can be updated or refined utilizing an accumulation of iterative closest point errors, which include vehicle position and heading errors to arrive at an estimate of the total pose of vehicle 102 in a map-referenced frame. Computer 104 can then transmit vehicle total pose to an autonomous vehicle driving application so that appropriate control functions can be exercised. Computer 104 can then actuate such control functions, which may include, for example, applying steering commands to shift the position of vehicle 102, positioning the vehicle closer to a road marking, such as road marking 205 of FIG. 2.

Process 400 begins at block 405, at which computer 104 acquires satellite positioning signals, such as GPS signals, as well as input signals from non-camera sensors 108. Computer 104 can receive input signals that represent wheel speed, wheel orientation, inertial measurement, odometry, as well as signals from an onboard radar sensor, an onboard lidar sensor, etc.

Process 400 continues at block 410, at which computer 104 computes an estimate of the pose of vehicle 102 in a global reference frame. Computer 104 may compute an estimate of the pose of vehicle 102 utilizing an optimal filter, such as an averaging filter, a Kalman filter, a particle filter, etc., to adaptively extract desired signals or inputs in the presence of interfering signals and/or inputs.

Process 400 continues at block 415, which includes computer 104 transmitting an estimate of the GPS-referenced pose, e.g., 335, of vehicle 102 to compute map-referenced pose, such as in block 310.

Process 400 continues at block 420, which includes computer 104 receiving input signals that represent features of digital map 315 as well as receiving image data from camera 105. At block 420, computer 104 can access one or more features of digital map 315 that are nearby, or coincident with, the GPS-estimated pose of vehicle 102 obtained at block 415.

Process 400 continues at block 425, which includes computer 104 performing an iterative closest point process, e.g., 325, in which, at each iteration, each camera-observed object is (tentatively) associated with the map feature closest to the camera-observed object, so as to update the transformation from the previous map-referenced frame to the current map-referenced frame. Block 425 may include computer 104 iteratively aligning one or more features from digital map 315 with corresponding features observed by camera 105. In an example, road markings observed by camera 105 may be iteratively aligned with markings indicated by digital map 315.

Process 400 continues at block 430, which includes computer 104 computing an instantaneous error between the estimated total pose in the propagated previous map-referenced frame and the updated total Pose (effective map shifted ground truth pose) in the current map-referenced frame, which may provide an initialized estimate of an error between the estimated location of features in a global reference frame and corresponding features at estimated locations from digital map 315. At block 430, computation of instantaneous error between the estimated total pose in the propagated previous map-referenced frame and the updated total pose (e.g., effective map-shifted ground truth pose) in the current map-referenced frame involves computer 104 computing an instantaneous value of an error in accordance with block 320. Computer 104 can then combine output signals from total pose compute block 310 with initialized results of iterative closest point block 325. As iterative closest point block 325 represents an iterative process, repeated executions of the process result in obtaining the total pose of vehicle 102 from the previous map-referenced frame to the current map-referenced frame.

Process 400 continues at block 435, which includes computer 104 computing cumulative errors, which includes an estimate of errors in the location of the feature, e.g., a road marking, from digital map 315 and an error in a computed GPS location computed in a global reference frame. Accordingly, cumulative errors may include an accumulation of first and second errors. In an example, computer 104 may add an estimate of errors in the location of the feature indicated on digital map 315, e.g., a road marking, to errors, e.g., first errors, in a global reference frame computed at block 410.

Process 400 continues at block 440, which includes computer 104 computing an estimate of combined first and second errors, e.g., errors in vehicle pose computed in a global reference frame and errors from digital map 315 utilizing past estimates combined first and second errors. In an example, computer 104 can implement a motion model utilizing error optimal filter predict block 345 to combine input signals representing data from non-camera sensors 108 past estimates of second errors to predict an estimate of total vehicle pose error, e.g., third error, in a current measurement frame.

Process 400 continues at block 445, which includes computer 104 transmitting the updated estimated vehicle total pose error for use in computing vehicle total pose. Computing an updated estimated vehicle total pose error can involve updating a predicted error in vehicle total pose utilizing an accumulation of instantaneous vehicle position and heading errors obtained via a comparison between a camera-observed feature, e.g., road marking, and a corresponding feature from digital map 315.

Process 400 may continue at block 450, which includes 104 computing vehicle total pose in a map-referenced frame, e.g., block 310, which represents a combination of errors in the GPS-referenced pose of vehicle 102 and map errors (e.g., first and second errors) and errors introduced by a motion model (e.g., third errors). A computed vehicle total pose can be updated by adding accumulation of instantaneous errors obtained via comparison of a camera-observed feature, e.g., by camera 105, and a corresponding feature depicted on digital map 315.

Process 400 continues at block 455, which includes computer 104 actuating an autonomous vehicle control function in response to the total pose computation at block 450. For example, block 455 may include computer 104 exercising control over steering of vehicle in a direction of a road marking so as to position the vehicle at a desired location relative to markings 205 of FIG. 2. In another example, computer 104 can actuate at least one of a propulsion system of vehicle 102, a brake system of vehicle 102, and the steering system of vehicle 102. For example, computer 104 may actuate the steering system of vehicle 102 based on the distances to boundaries as part of a travel-path feature, e.g., steering to position vehicle 102 within boundaries identified by camera 105.

After block 455, process 400 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It should further be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:

determine an estimated pose of a vehicle in a global reference frame, the estimated pose having a first error;

determine an estimated second error based on a combination of the first error in the estimated pose and a map error, the map error being the difference between the estimated pose of the vehicle in the global reference frame and a corresponding estimated pose of the vehicle in a map-referenced frame;

predict a third error in a future map-referenced measurement frame based on the estimated second error and based on a motion model; and compute an update to the third error by combining the predicted third error with an accumulation of instantaneous vehicle position and heading errors obtained via a comparison between a camera-observed feature and a corresponding feature depicted on a digital map.

2. The computer of claim 1, wherein the instructions further include instructions to compute an estimate of the pose of the vehicle in the map-referenced frame.

3. The computer of claim 1, wherein the instructions further include instructions to actuate a component of the vehicle based on the computed update to the third error.

4. The computer of claim 1, wherein the instructions further include instructions to track the computed update to the third error via a closed-loop process.

5. The computer of claim 1, wherein the instructions further include instructions to track the computed update to the third error via a closed-loop optimal filtering process.

6. The computer of claim 1, wherein the instructions further include instructions to:

track the computed update to the third error; and identify a degradation in a function of a sensor of the vehicle based on a change in the difference in an estimated pose in the global reference frame and an updated map-referenced frame.

7. The computer of claim 1, wherein the feature on the digital map indicates a road marking in a roadway.

8. The computer of claim 1, wherein the determined estimated second error in an initialization measurement frame comprises a value of less than a distance determined based on a width of the vehicle travel path.

9. The computer of claim 1, wherein an update to the third error is a continuous function as a function of time.

10. The computer of claim 1, wherein the instructions to determine the estimated second error do not apply a correction to the position of the feature in the global reference frame.

11. The computer of claim 1, wherein the instructions to determine the estimated second error include instructions to fuse inputs from a digital map and a sensor of a global positioning system (GPS), a camera, and at least one of a wheel speed sensor, a radar sensor, and an inertial measurement unit.

12. The computer of claim 1, wherein the estimated pose of the vehicle in the map-referenced frame includes errors in a heading of the vehicle, errors longitudinal to the heading of the vehicle, and/or errors in a direction lateral to the heading of the vehicle.

13. The computer of claim 1, wherein the comparison between the camera-observed feature and the corresponding feature on the digital map is obtained via aligning the digital map feature with the feature observed by the camera.

14. The computer of claim 1, wherein the instructions to determine the estimated pose of a vehicle in a global reference frame include instructions to implement an optimal filter.

15. The computer of claim 1, wherein the instructions to determine the estimated pose of the vehicle in the global reference frame and instructions to determine the estimated second error based on the combination of the first error in the estimated pose with the map error operate as separate optimal filtering processes.

16. A method comprising:

determining an estimated pose of a vehicle in a global reference frame, the estimated pose having a first error;

determining an estimated second error based on a combination of the first error in the estimated pose and a map error, the map error being the difference between the estimated pose of the vehicle in the global reference frame and a corresponding estimated pose of the vehicle in a map-referenced frame;

predicting a third error in a future map-referenced measurement frame based on the estimated second error and based on a motion model; and computing an update to the third error by combining the predicted third error with an accumulation of instantaneous vehicle position and heading errors obtained via a comparison between a camera-observed feature and a corresponding feature depicted on a digital map.

17. The method of claim 16, further comprising:

tracking the estimated pose of the vehicle in a map-referenced frame and the estimated pose of the vehicle in the global reference frame simultaneously; and identifying a degradation of a function of a sensor or of an algorithm based on a change in the difference between the estimated pose of the vehicle in the global reference frame and the estimated pose of the vehicle in the global reference frame exceeding a threshold value in an updated measurement frame.

18. The method of claim 16, wherein the feature on the digital map corresponds to a marking in a roadway.

19. The method of claim 16, wherein the determined estimated second error in an initialization measurement frame comprises a value of less than a distance determined based on a width of the vehicle travel path.

20. The method of claim 16, wherein the determining the estimated pose of the vehicle in the global reference frame and the determining the estimated second error based on the combination of the first error in the estimated pose with the map error operate as separate optimal filtering processes.

* * * * *